United States Patent
Minoshima et al.

(10) Patent No.: US 6,757,120 B2
(45) Date of Patent: Jun. 29, 2004

(54) DYNAMIC METHOD AND APPARATUS FOR CONTROLLING HEAD FLY CHARACTERISTICS IN A DISK DRIVE

(75) Inventors: Yoichi Minoshima, Rochester, MN (US); Mario Yamaguchi, Rochester, MN (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 334 days.

(21) Appl. No.: 10/093,137

(22) Filed: Mar. 7, 2002

(65) Prior Publication Data

US 2003/0169526 A1 Sep. 11, 2003

(51) Int. Cl.[7] ............................................. G11B 27/36
(52) U.S. Cl. ......................................... 360/31; 360/75
(58) Field of Search ............................. 360/31, 75, 76, 360/77.03, 78.11, 77.08, 78.14; 324/210, 212, 226

(56) References Cited

U.S. PATENT DOCUMENTS

| | | |
|---|---|---|
| 5,168,413 A | 12/1992 | Coker et al. |
| 5,625,506 A | 4/1997 | Dovek et al. |
| 6,359,746 B1 * | 3/2002 | Kakekado et al. ............. 360/75 |
| 6,366,416 B1 * | 4/2002 | Meyer et al. .................. 360/25 |
| 6,700,724 B2 * | 3/2004 | Riddering et al. ............ 360/69 |
| 2002/0097517 A1 * | 7/2002 | Bonin et al. .................. 360/75 |

* cited by examiner

*Primary Examiner*—Alan T. Faber
(74) *Attorney, Agent, or Firm*—Joan Pennington

(57) ABSTRACT

A dynamic method and apparatus are provided for controlling head fly characteristics in a disk drive. A plurality of charge surfaces is provided with a transducer head slider assembly. At least one head fly characteristic is monitored during operation of the disk drive. An identified current head fly characteristic is compared with a predefined head fly characteristic to identify a difference value. A charge and potential of the plurality of charge surfaces are dynamically controlled responsive to the identified difference value. Dynamically controlling the charge and potential of the plurality of charge surfaces enables both dynamically controlling flyheight of the transducer head slider assembly and dynamically controlling angles of the transducer head slider assembly relative to an associated disk surface.

20 Claims, 6 Drawing Sheets

DYNAMIC METHOD AND APPARATUS FOR CONTROLLING HEAD FLY CHARACTERISTICS IN A DISK DRIVE

FIELD OF THE INVENTION

The present invention relates generally to the data processing field, and more particularly, relates to a dynamic method and apparatus for controlling head fly characteristics in a disk drive.

DESCRIPTION OF THE RELATED ART

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the disk axis of rotation write data to the disks and read data from the disks. Data located on a particular track on a disk surface is read or written by properly positioning a data transducer head directly over the track. In order to maintain the head in proper position over the data track, servo systems typically are incorporated into disk drives.

During operation of a disk drive, various conditions can cause changes in flyheight, such as accumulation of contamination debris on a head or disk can cause low flying height. Protruding disk defects or asperities can occur during operation of the disk drive and cause physical head-to-disk contact. Various arrangements have been provided for measuring flying height changes of a transducer head relative to a disk surface of a rotating disk in a disk file.

For example, U.S. Pat. No. 5,168,413 issued Dec. 1, 1992 to Coker et al., and assigned to the present assignee, discloses a method and apparatus are provided for measuring flying height changes of a transducer head relative to a disk surface of a rotating disk in a disk file. A predetermined pattern is written on at least one predetermined region of the disk file. The predetermined region is normally not rewritten during operation of the disk file. At least one readback signal is sensed from at least one predetermined region of the disk surface. A plurality of sample values are identified corresponding to each readback signal. A change in the flying height is calculated utilizing the identified sample values. A frequency equalization number K can be utilized to calculate the magnitude and sign of the flying height change. Alternatively, real-time digital analysis of a predetermined pattern written on at least one predetermined region of the disk surface can be utilized to calculate the magnitude and sign of the flying height change.

U.S. Pat. No. 5,625,506 issued Apr. 29, 1997 to Dovek et al., and assigned to the present assignee, discloses a method and apparatus are provided for maintaining file readback performance compensating for readback errors caused by head/disk interaction used with a data detection channel in a direct access storage device. A readback signal is sensed from at least one disk surface and a data channel error rate is detected responsive to the readback signal. The detected data channel error rate is compared with a first predetermined threshold value and a gain of a phase lock loop (PLL) in the peak data detection channel is optimized responsive to an identified data channel error rate with a first predetermined threshold value. The PLL gain is adjusted until a lowest error rate is detected. A failure warning for the direct access storage device is provided to a user when the detected PLL gain is greater than a predefined loop gain value.

In a conventional disk drive, once a transducer head is manufactured an assembled in the drive, it is not possible to control the fly characteristics, such as flyheight and angles relative to the disk surface.

A need exists for an effective mechanism for controlling head fly characteristics in a disk drive.

SUMMARY OF THE INVENTION

A principal object of the present invention is to provide a dynamic method and apparatus for controlling head fly characteristics in a disk drive. Other important objects of the present invention are to provide such dynamic method and apparatus for controlling head fly characteristics in a disk drive substantially without negative effect; and that overcome some of the disadvantages of prior art arrangements.

In brief, a dynamic method and apparatus are provided for controlling head fly characteristics in a disk drive. A plurality of charge surfaces is provided with a transducer head slider assembly. At least one head fly characteristic is monitored during operation of the disk drive. An identified current head fly characteristic is compared with a predefined head fly characteristic to identify a difference value. A charge and potential of the plurality of charge surfaces are dynamically controlled responsive to the identified difference value.

In accordance with features of the present invention, dynamically controlling the charge and potential of the plurality of charge enables both dynamically controlling flyheight of the transducer head slider assembly and dynamically controlling angles of the transducer head slider assembly relative to an associated disk surface.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
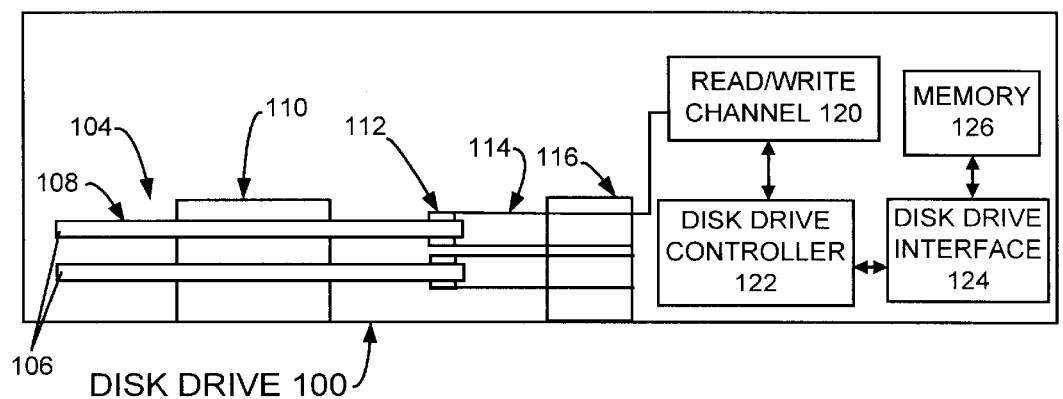
FIG. 1 is a schematic and block diagram representation illustrating a disk drive for implementing methods for controlling head fly characteristics in accordance with the preferred embodiment.

Having reference now to the drawings, in FIG. 1 there is illustrated a direct access data storage device (DASD) or disk drive generally designated as 100 for controlling head fly characteristics for the disk drive 100 in accordance with the preferred embodiment. As shown in FIG. 1, disk drive 100 includes a stack 104 of disks 106 each having at least one magnetic surface 108. The disks 106 are mounted parallel to one another for simultaneous rotation on and by an integrated spindle and motor assembly 110. Information on each magnetic disk surface 108 is read from or written to the disk surface 108 by a corresponding transducer head slider assembly 112 movable in a path having a radial component across the rotating disk surface 108.

An arm 114 carries each transducer head slider assembly 112. The arms 114 are ganged together for simultaneous pivotal movement by a voice coil motor (VCM) magnet assembly or actuator 116. Drive signals applied to the VCM magnet assembly 116 cause the arms 114 to move in unison to position the transducer head slider assemblies 112 in registration with information storage tracks on the disk surfaces 108 where information is written or read.

Disk drive 100 includes a read/write channel 120 coupled to the transducer head slider assemblies 112 and coupled to a disk drive controller 122 that generates signals controlling the operation of various components of the disk drive 100. Disk drive 100 includes a disk drive interface 124 coupled to the disk drive controller 122 and a memory 126. A host computer (not shown) provides data read and write commands to the disk drive, and data signals are transmitted to or from the transducer head assemblies 112.

Figure 5:
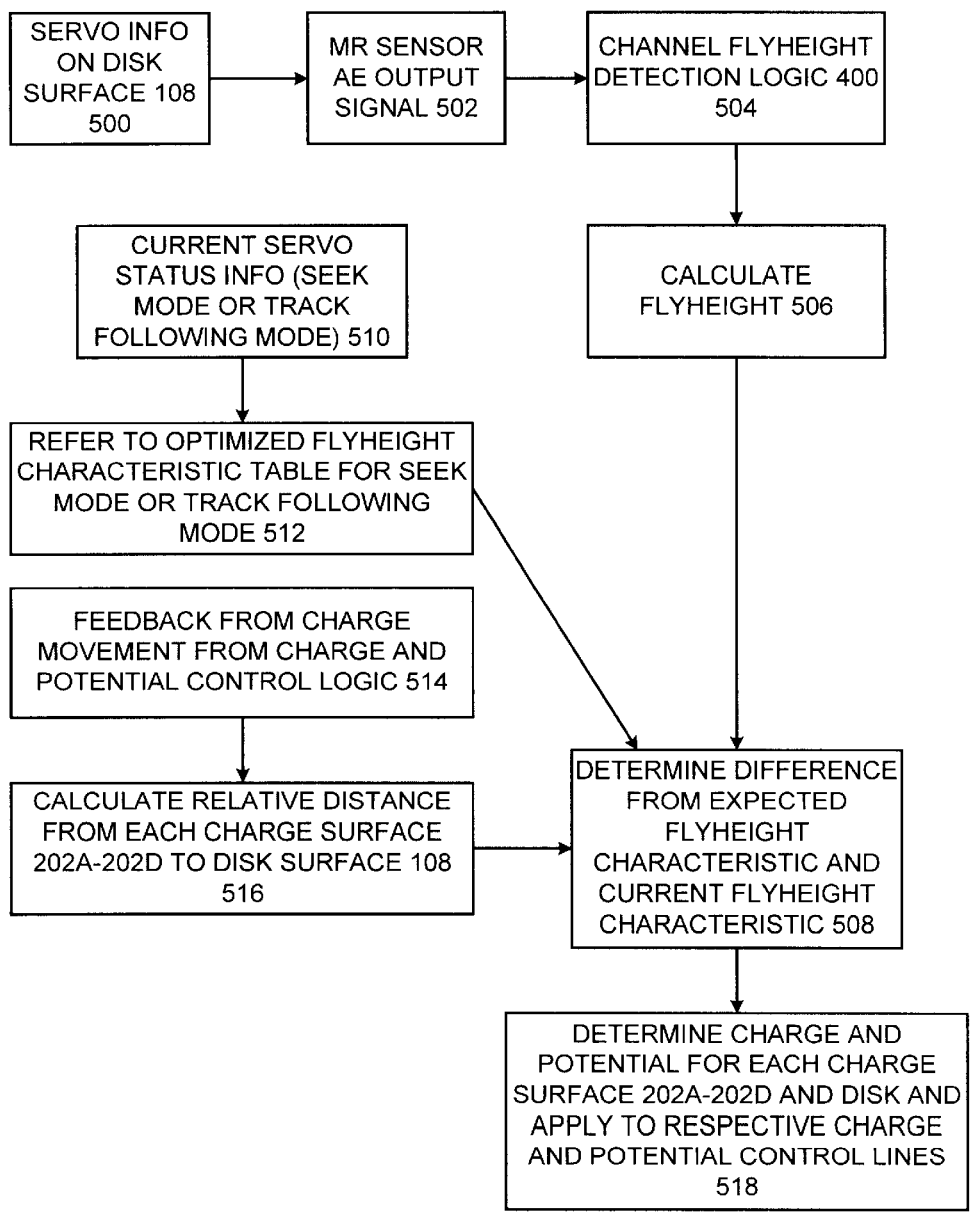
FIG. 5 is a block diagram illustrating exemplary functional control logic blocks for implementing head fly characteristics control in accordance with the preferred embodiment.

Disk drive controller 122 is suitably programmed for implementing head fly characteristics control for the disk drive 100 in accordance with the preferred embodiment. Disk drive controller 122 is suitably programmed to execute the flow functions of the preferred embodiment as illustrated in FIG. 5.

Figure 2:
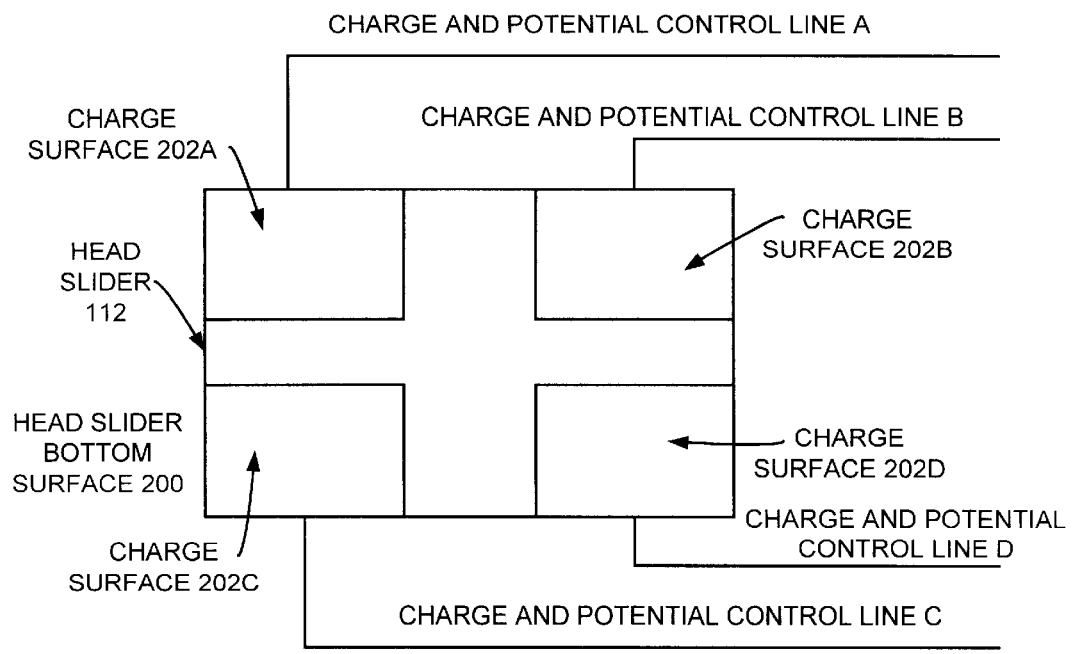
FIGS. 2, 3 and 4 are schematic and block diagrams illustrating apparatus for controlling head fly characteristics in the disk drive of FIG. 1 in accordance with the preferred embodiment.

Referring now to FIG. 2, there is shown a bottom surface 200 underneath a transducer head air bearing surface (ABS) of the transducer head slider assembly 112. Head slider bottom surface 200 includes a plurality of charge surfaces or charge pads 202A, 202B, 202C, and 202D for controlling head fly characteristics in the disk drive 100 in accordance with the preferred embodiment. As shown in FIG. 2, the head slider bottom surface 200 is rectangular. The charge surfaces 202A, 202B, 202C, and 202D are spaced apart and located at corners of the rectangular head slider bottom surface 200. The charge surfaces 202A, 202B, 202C, and 202D are formed of a semiconductor material, such as silicon. A respective charge and potential control line is coupled to each of the charge surfaces 202A, 202B, 202C, and 202D for controlling electrical charge amounts on each of the charge surfaces and controlling head fly characteristics.

Figure 3:
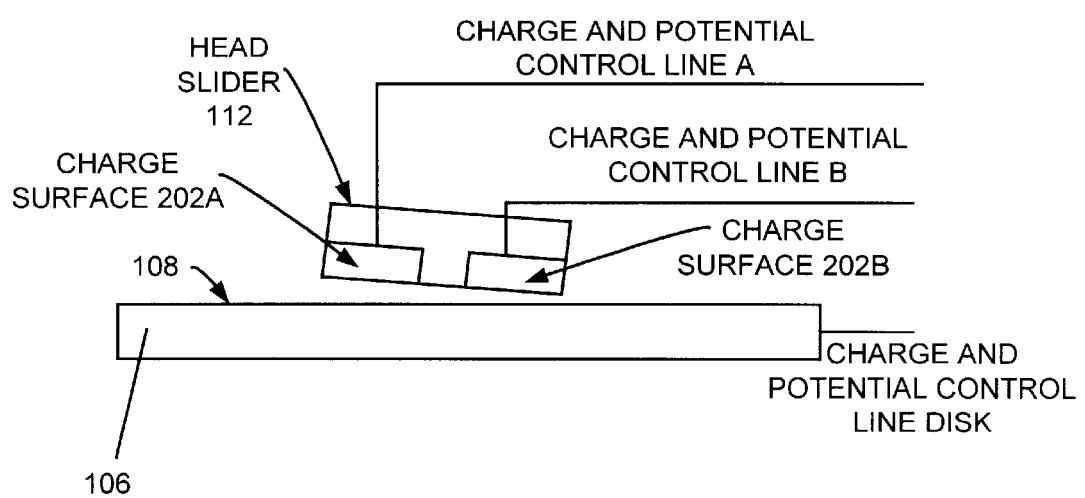

Referring also to FIG. 3, an enlarged view is shown of a side head slider surface 300 of the transducer head slider assembly 112 and disk 106. The transducer head slider assembly 112 is spaced above the top disk surface 108 at an angle with the charge surface 202A spaced further away from the disk surface 108 than the charge surface 202B. As shown in FIG. 3, a charge and potential control line also is coupled to each disk 106.

In accordance with features of the preferred embodiment, the fly characteristics of the transducer head slider assembly 112 are dynamically controlled including dynamically controlling both flyheight and angles of the transducer head slider assembly 112 relative to the disk surface. The head fly characteristics are controlled through electric charge amount control respectively applied to each of the charge surfaces 202A, 202B, 202C, and 202D and to the disk 106.

Figure 4:
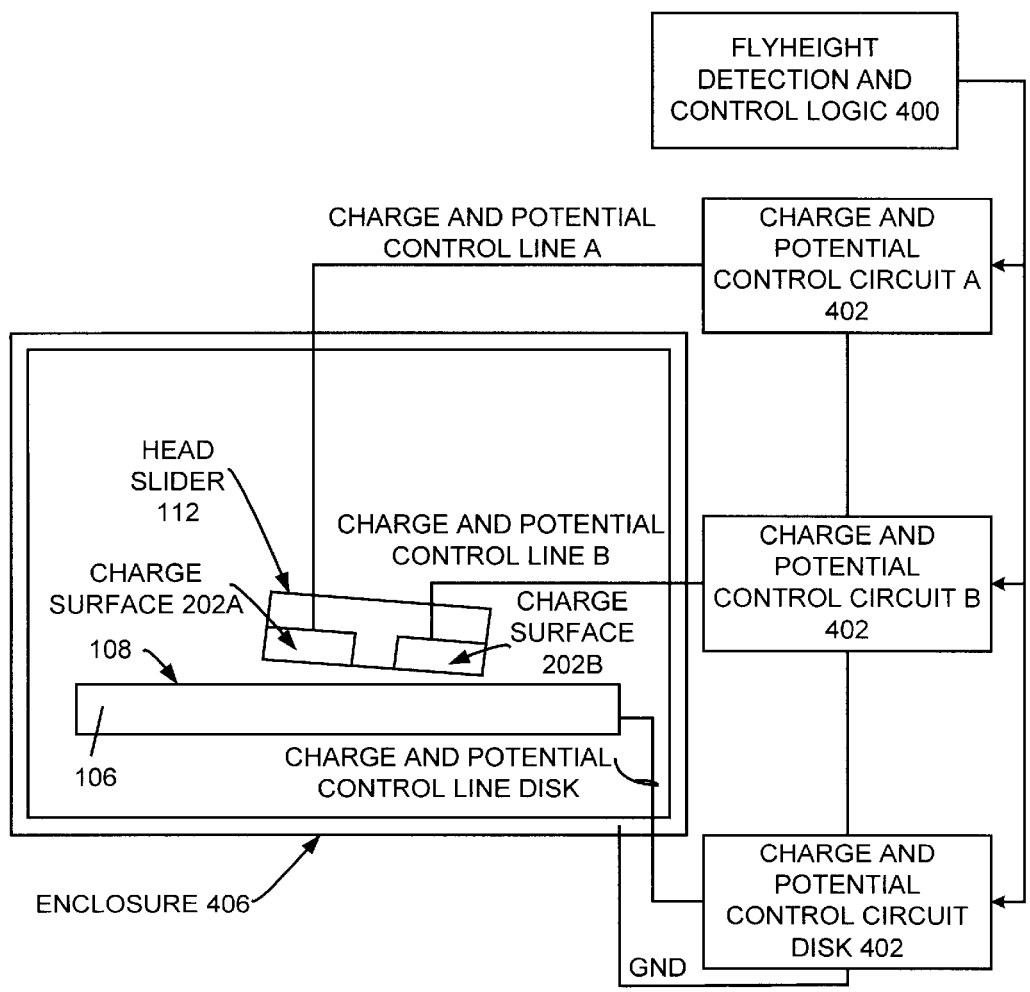

Referring also to FIG. 4, a flyheight detection and control logic block 400 dynamically controls a respective charge and potential control circuit 402 respectively coupled to each of the charge surfaces 202A, 202B, 202C, and 202D and disk 106. An enclosure 406 contains each disk 106 and each of the associated transducer head slider assemblies 112. As shown in FIG. 3, a ground reference labeled GND is connected from the enclosure 406 to each of the charge and potential control circuits 402. The charge and potential control circuits 402 control head flyheight characteristics through electric charge amount control respectively applied to each of the charge surfaces 202A, 202B, 202C, and 202D and disk 106.

FIG. 5 illustrates exemplary functional control logic blocks of flyheight detection and control logic block 400 for implementing head fly characteristics control in accordance with the preferred embodiment. Servo information on disk surface 108 is read as indicated in a block 500. A transducer head or MR sensor of the transducer head slider assembly 112 provides an arm electronics (AE) output signal as indicated in a block 502 that is applied to a channel flyheight detection logic as indicated in a block 504. Flyheight is calculated as indicated in a block 506 and applied to a block 508 to determine a difference from expected flyheight characteristic and current flyheight characteristic. Current servo status information identifying a seek mode or track following mode is obtained as indicated in a block 510 and used to reference a stored optimized flyheight characteristic table as indicated in a block 512. The optimized flyheight characteristic for the seek mode or track following mode is applied to the difference determination block 508. A feedback from charge movement from the charge and potential control logic obtained as indicated in a block 514 is applied to a calculation block 516. A relative distance from each of the charge surfaces 202A, 202B, 202C, and 202D to disk 106 is calculated at block 516 and applied to the difference determination block 508. The calculated difference from expected flyheight characteristic and current flyheight characteristic at block 508 is applied to a block 518 to determine and apply a charge and potential for each of the charge surfaces 202A, 202B, 202C, and 202D and disk 106.

Figure 6:
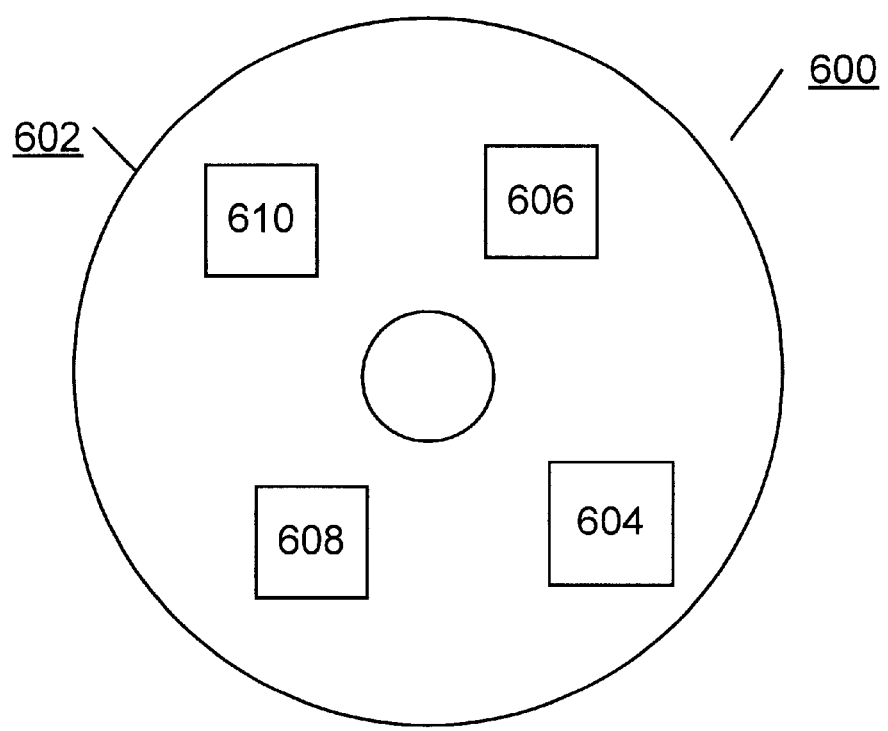
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for controlling head fly characteristics of the preferred embodiment in the disk drive 100 of FIG. 1.

A sequence of program instructions or a logical assembly of one or more interrelated modules defined by the recorded program means 604, 606, 608, 610, direct the disk drive controller 122 of disk drive 100 for controlling head fly characteristics of the preferred embodiment.

While the present invention has been described with reference to the details of the embodiments of the invention shown in the drawing, these details are not intended to limit the scope of the invention as claimed in the appended claims.

What is claimed is:

1. A dynamic method for controlling head fly characteristics in a disk drive comprising the steps of:

providing a plurality of charge surfaces on a transducer head slider assembly;

monitoring at least one head fly characteristic during operation of the disk drive;

comparing an identified current head fly characteristic with a predefined head fly characteristic to identify a difference value; and dynamically controlling a charge and potential of said plurality of charge surfaces responsive to said identified difference value.

2. A dynamic method for controlling head fly characteristics in a disk drive as recited in claim 1 wherein the step of providing said plurality of charge surfaces on a transducer head slider assembly includes the step of forming said plurality of charge surfaces of a semiconductor material.

3. A dynamic method for controlling head fly characteristics in a disk drive as recited in claim 1 wherein the step of monitoring said at least one head fly characteristic during operation of the disk drive includes the steps of reading servo information of a disk surface; applying a servo readback signal to a channel flyheight detection function; and calculating a transducer head flyheight.

4. A dynamic method for controlling head fly characteristics in a disk drive as recited in claim 3 wherein the step of comparing said identified current head fly characteristic with said predefined head fly characteristic to identify said difference value includes the step of utilizing said calculated transducer head flyheight to identify said difference value.

5. A dynamic method for controlling head fly characteristics in a disk drive as recited in claim 1 wherein the step of monitoring said at least one head fly characteristic during operation of the disk drive includes the steps of identifying a current servo mode and referencing a predefined flyheight characteristic table for an identified current servo mode.

6. A dynamic method for controlling head fly characteristics in a disk drive as recited in claim 5 wherein the steps of identifying said current servo mode and referencing said predefined flyheight characteristic table for said identified current servo mode includes the steps of identifying one of a seek mode or a track following mode and referencing said predefined flyheight characteristic table for said identified current seek mode or said track following mode.

7. A dynamic method for controlling head fly characteristics in a disk drive as recited in claim 5 wherein the step of comparing said identified current head fly characteristic with said predefined head fly characteristic to identify said difference value includes the step of utilizing said referenced predefined flyheight characteristic table for said identified current servo mode to identify said difference value.

8. A dynamic method for controlling head fly characteristics in a disk drive as recited in claim 1 wherein the step of monitoring said at least one head fly characteristic during operation of the disk drive includes the steps of identifying feedback from applied charge movement from said dynamically controlled charge and potential of said plurality of charge surfaces responsive to said identified difference value; and calculating a relative distance from each said plurality of charge surfaces to an associated disk.

9. A dynamic method for controlling head fly characteristics in a disk drive as recited in claim 8 wherein the step of comparing said identified current head fly characteristic with said predefined head fly characteristic to identify said difference value includes the step of utilizing said calculated relative distance from each said plurality of charge surfaces to an associated disk to identify said difference value.

10. A dynamic method for controlling head fly characteristics in a disk drive as recited in claim 1 wherein the step of dynamically controlling said charge and potential of said plurality of charge surfaces responsive to said identified difference value includes the step of dynamically controlling a charge and potential of an associated disk.

11. A dynamic method for controlling head fly characteristics in a disk drive as recited in claim 1 wherein the step of dynamically controlling said charge and potential of said plurality of charge surfaces responsive to said identified difference value includes the step of providing a respective charge and potential control circuit coupled to each of said plurality of charge surfaces; and providing flyheight detection and control logic coupled to each said respective charge and potential control circuit for dynamically controlling said charge and potential of said plurality of charge surfaces.

12. A dynamic method for controlling head fly characteristics in a disk drive as recited in claim 1 wherein the step of dynamically controlling said charge and potential of said plurality of charge surfaces responsive to said identified difference value includes the step of dynamically controlling said charge and potential of said plurality of charge surfaces responsive to said identified difference value for dynamically controlling flyheight of said transducer head slider assembly.

13. A dynamic method for controlling head fly characteristics in a disk drive as recited in claim 1 wherein the step of wherein the step of dynamically controlling said charge and potential of said plurality of charge surfaces responsive to said identified difference value includes the step of dynamically controlling said charge and potential of said plurality of charge surfaces responsive to said identified difference value for dynamically controlling angles of said transducer head slider assembly relative to an associated disk surface.

14. Apparatus for dynamically controlling head fly characteristics in a disk drive comprising:
   a transducer head slider assembly including a plurality of charge surfaces;
   a respective charge and potential control circuit coupled to each of said plurality of charge surfaces; and
   flyheight detection and control logic coupled to each said respective charge and potential control circuit for dynamically controlling said charge and potential of said plurality of charge surfaces.

15. Apparatus for dynamically controlling head fly characteristics in a disk drive as recited in claim 14 includes a charge and potential control circuit coupled to an associated disk; and said flyheight detection and control logic coupled to said charge and potential control circuit for dynamically controlling said charge and potential of said associated disk.

16. Apparatus for dynamically controlling head fly characteristics in a disk drive as recited in claim 14 wherein said flyheight detection and control logic includes control logic functions for monitoring at least one head fly characteristic during operation of the disk drive; for comparing an identified current head fly characteristic with a predefined head fly characteristic to identify a difference value; and for dynamically controlling a charge and potential of said plurality of charge surfaces responsive to said identified difference value.

17. Apparatus for dynamically controlling head fly characteristics in a disk drive as recited in claim 14 wherein said flyheight detection and control logic includes control logic functions for receiving a servo readback signal from an associated disk and for calculating a flyheight of said transducer head slider assembly.

18. Apparatus for dynamically controlling head fly characteristics in a disk drive as recited in claim 14 wherein said flyheight detection and control logic includes control logic functions for identifying a current servo seek or track following mode and for identifying a predefined flyheight characteristic for said identified current servo seek or track following mode.

19. Apparatus for dynamically controlling head fly characteristics in a disk drive as recited in claim 14 wherein said flyheight detection and control logic includes control logic functions for receiving feedback from charge movement from said respective charge and potential control circuit coupled to each of said plurality of charge surfaces and for identifying a relative distance from each of said plurality of charge surfaces to an associated disk.

20. Apparatus for dynamically controlling head fly characteristics in a disk drive as recited in claim 14 wherein said flyheight detection and control logic includes control logic functions for dynamically controlling said charge and potential of said plurality of charge surfaces for dynamically controlling flyheight of said transducer head slider assembly and for dynamically controlling angles of said transducer head slider assembly relative to an associated disk surface.

* * * * *